United States Patent [19]

Gössmann et al.

[11] Patent Number: 4,621,402

[45] Date of Patent: Nov. 11, 1986

[54] APPARATUS AND METHOD FOR ASSEMBLING UNIVERSAL JOINTS

[75] Inventors: Willi Gössmann, Niederwerrn; Gebhard Pape, Schweinfurt; Norbert Klupfel; Josef Stark, both of Hambach, all of Fed. Rep. of Germany

[73] Assignee: SKF Kugellagerfabriken GmbH, Schweinfurt, Fed. Rep. of Germany

[21] Appl. No.: 650,532

[22] Filed: Sep. 14, 1984

[30] Foreign Application Priority Data

Sep. 17, 1983 [DE] Fed. Rep. of Germany ....... 3333666

[51] Int. Cl.[4] ...................... B23Q 17/00; B21D 53/10
[52] U.S. Cl. ......................................... 29/407; 29/725
[58] Field of Search .................................. 29/407, 725

[56] References Cited

U.S. PATENT DOCUMENTS 3,230,617 1/1966 Spiess et al. ...................... 29/725

FOREIGN PATENT DOCUMENTS 1527557 7/1969 Fed. Rep. of Germany .

Primary Examiner—Mark Rosenbaum
Assistant Examiner—Steven Nichols
Attorney, Agent, or Firm—Eugene E. Renz, Jr.

[57] ABSTRACT

The invention pertains to a process and a device for the assembly of universal joints. In order to reduce the defect of center misalignment of the joint parts with respect to each other which characterized the joints after assembly, the center misalignment resulting from different pressing forces on the bearings and from other manufacturing tolerances are measured according to the invention during assembly, whereupon appropriate corrective forces are generated to eliminate the misalignment of the centers.

6 Claims, 1 Drawing Figure

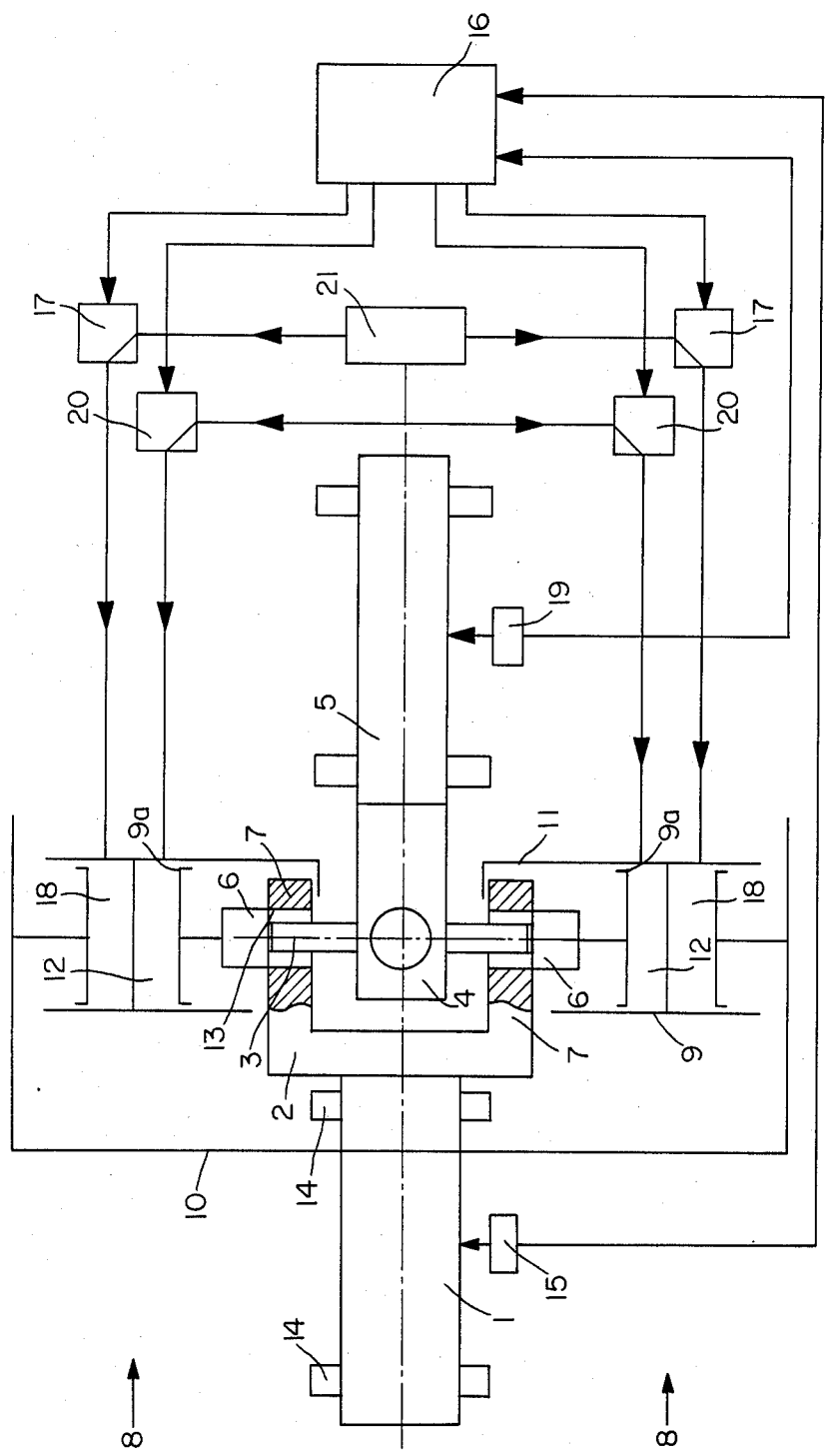

APPARATUS AND METHOD FOR ASSEMBLING UNIVERSAL JOINTS

BACKGROUND OF THE INVENTION

The present invention relates to improvements in method and apparatus for assembling universal joints.

It is already known from West German Publication No. 1,527,557 that bearings can be pressed into the bores of the fork arms of a universal joint assembly by means of floating pressure units without any reaction forces and fixed axially in place, for example, by peening. By this arrangement, the joint cross is positioned in a peening operation in a finished mounting arrangement. The cross piece of the joint is supposed to be free of axial play and to produce in the pivoting direction a braking moment which is often referenced as a bending moment. The bending moment is produced by reason of the fact that the bearings are fixed in place while the fork arms are spread apart under pretension whereby the lower face of the bearing cups lie against the ends of the universal joint pins. In this known arrangement, the bearings are first pressed into the bearing bores simultaneously, whereby each fork arm is supported by a hook-like support element from the rear to secure it to each of the pressure units. In this manner, the pressure can act on the bearings by way of pressing tools without creating reaction forces. As soon as the bearings in the known system are in contact with the pins of the joint cross, continued pressing of the bearing spreads the fork arms which results in outward displacement of the floating pressure units. The displacement distance is limited by adjustable stops whereby a pretension is obtained by way of the spreading distance of the fork arms, which can be determined in advance.

These prior apparatus and systems have several disadvantages and drawbacks. Since manufacturing tolerances can cause cross-sectional and/or structural differences between the two fork arms, the joint fork being in cross section an unworked casting, there are differences in the restoring forces or pretensions of the fork arms even though the fork arms are pushed outward to the same extent. The differences in the restoring forces act by way of the bearings directly on the joint cross and shift it out of the precentered position. This produces non-tolerable misalignment of the centers of the two joint parts with respect to each other which can no longer be optimally compensated even by individual balancing, since the joint parts must be bent toward each other in order to fulfill their function. The difference between the restoring forces in the two fork arms also means that the bending moment varies sharply from one joint to another. This defect is aggravated even further by the unavoidable tolerances of the joint forks relative to one another and not merely between the fork arms of one joint fork.

A further disadvantage of these prior known designs becomes evident when there are different fit tolerances between the bearing and bearing bore in the two fork arms. This causes different pressing pressures which, particularly in the spreading phase, because of the internal stress results in pretension which differs considerably from the adjusted spreading distance so that the center misalignment of the joint parts can become even greater.

An additional center misalignment can also be anticipated in the case of the known design, because even if the machine stand is designed to be extremely stable, the differences in the pressing forces result in unilateral, elastic resilience. The joint parts themselves account for most of this difference because of a lack of internal stiffness. Further, for space considerations there is also the need for arranging the devices for clamping the joint parts during assembly at a distance from the point at which the force is actually applied. When the bearings are pressed into place, it cannot be avoided, therefore, that the bearing, which is easier to press in, reaches the pin of the joint cross first and because of the pressing force initially places the pin under pressure in a unilateral manner with respect to the joint fork. Depending on the stiffness, this causes a center misalignment which can no longer be compensated even after the other bearing has been seated against the joint cross, because normally, in order to avoid other defects, both pressure units exert equal forces once the bearings have made contact with the joint cross. The joint cross can, therefore, no longer leave the misalignment position it has assumed with respect to the joint fork. The same problem exists in the case of different peening forces. The above difficulties cannot be avoided except by precise individual pairing and matching of parts for each fork arm before each assembly operation. Thus, even though good results can be obtained with prior known apparatus and methods, they can only be obtained under ideal conditions, i.e. when the fork arms are completely free of tolerances as between themselves and from joint fork to joint fork, and correspondingly tolerance-free bearings are also available. As is commonly known, this is impossible in every day mass production assembly of parts of this type.

SUMMARY OF THE INVENTION

With the foregoing in mind, it is an object of the present invention to provide method and apparatus for assembling universal joints which produces better results in terms of the center misalignment of the joint parts even when assembling joint forks, bearings and bearing bores with the usual manufacturing tolerances are used. To this end and accordance with the method of the present invention, the joint cross is inserted and positioned initially in the joint cross, after which the bearings are pressed in and secured in place in the bearing bores of the two fork arms by means of separate pressure units. Each pressure unit is supported on a fork arm and has a main pressure system. The pressure system is characterized by novel features of construction and arrangement whereby corrective forces act on the two fork arms throughout the entire assembly operation, which forces are formed as a function of the misalignment of the centers of the joint parts with respect to each other in each case.

Because of the differences in the press fit resulting from manufacturing tolerances, and thus because of the differences in the pressing forces for the two bearings, the difference of these forces acts unilaterally on the joint fork or its shaft or stem. Although clamping devices can fix the fork in place, the center of the joint fork is, nevertheless, shifted with respect to its rest position because of its lack of intrinsic stiffness and the the lack of stiffness in the machine stand. This displacement of centers is determined advantageously at the outset by means of a measurement sensor. For example, by way of an electronic circuit, a corrective force is exerted by the pressure unit which is the secondary cause of center misalignment. The corrective force acts as a tensile force between the machine stand and the pressure unit, and as such it acts across its support pin on the fork arm in question. In this manner, the shaft returns to its original rest position. The sequence of functions just described is under analog control and in actuality occurs in a vanishingly small partial range of possible center misalignment, so that in accordance with the method of the present invention there is in practice no problematic center misalignment.

When one of the bearings makes contact sooner than the other with the corresponding pin of the joint cross, the clamp of the joint cross acts additionally to oppose the pressing force, so that the rest position of the joint fork determined previously by the measurement sensor is disturbed. An additional measurement sensor attached to the joint cross transmits its center misalignment to the electronic circuit, which brings about a new correction of the pressure relationship between the two pressure units and acts also on the main pressure system in this phase according to the features of claim 4, in that the pressure relationship of one to the other is corrected until the joint cross no longer has any center misalignment.

The device according to the invention is active throughout the entire assembly of the universal joint and prevents center misalignment of the joint parts when different pressing forces are required or when errors in the joint forks caused by manufacturing tolerances are the cause of different pretensions in the two fork arms.

When in a second assembly step a second joint fork is assembled with the joint cross or if the entire assembly occurs in one clamp, the measurement sensor can also be attached to the second joint fork.

In an advantageous embodiment of the invention, a partial force is generated in each pressure unit independently by its secondary pressure system; this partial force keeps the pretension of the fork arms constant and is proportional to the prevailing pressure of the main pressure system. The partial force acts between the machine stand and the fork arm and reduces the pretension resulting from the main pressure system to the required level. In this way the pretension is independent of the widely varying pressing force, by which means it is possible to obtain bending moments for the joint parts with respect to each other which are within narrow tolerances.

In other concrete examples of the device according to the invention, the measurement sensors are displacement pickups or force pickups, which are attached to the devices for clamping the joint parts. The force pickups are especially advantageous, because they are sturdy and insensitive and also do not interfere with the handling of the joint parts.

BRIEF DESCRIPTION OF THE DRAWINGS

These and other objects of the present invention are hereinafter more fully set forth with reference to the accompanying drawings, wherein:

FIG. 1 shows a schematic view of method and apparatus for assembling universal joints in accordance with the present invention.

DESCRIPTION OF THE PREFERRED EMBODIMENT

Referring now to the drawing, there is, as illustrated, an apparatus for assembling a joint fork 2 connected to a shaft 1 having a joint cross 3 which is already assembled with a second joint fork 4 with a shaft 5. The arrangement illustrated serves both to press and peen bearings 6 and in accordance with the present invention to control and correct the pressing forces in order to prevent center misalignment of joint parts 2, 3, 4.

The apparatus consists essentially of two pressure units 8 opposite each other, one for each fork arm 7. The housing 9 of these pressure units is freely movable in the pressing direction in guides 9a on a machine stand 10 and is provided with hook-like support elements 11, which hold the free ends of the fork arms 7. In this manner, a pressing or peening force generated by the main pressure system 12 for fixing the bearings 6 in bearing bores 13 acts on fork arms 7 without any reaction force. Bearings 6 and bearing bores 13 have different press-fits in the two fork arms 7 because of manufacturing tolerances, which means that fork arms 7 are spread by different amounts. This results in a force which comes from the pressing or peening forces that act unilaterally on the entire joint fork 2; because of the lack of stiffness of devices 14 for clamping shaft 1 and shaft 1 itself, the shaft bends, or joint fork 2 acquires a center misalignment with respect to its rest position and with respect to joint cross 3. This misalignment of centers is converted by way of the bending of shaft 1 by a measurement sensor 15 into an electric voltage, which is transmitted to an electronic circuit 16. This circuit then forms a control voltage for one servo unit 17 in each case, which in turn produces by way of a secondary pressure system 18 a corrective force between machine stand 10 and main pressure system 12 or housing 9 of pressure unit 8. This corrective force acts on joint fork 2 and returns it to its rest position, by which means the center misalignment is compensated. So that the position of the fork arms with respect to each other is not changed, and so that it is possible to make corrections easily in both directions, each pressure unit 8 has a secondary pressure system 18.

When one of the two bearings 6 makes contact prematurely with joint cross 3, a unilateral force is exerted on the cross, which likewise causes a center misalignment and a bending of the second joint fork 4 including shaft 5. This center misalignment is also transmitted to electronic circuit 16, by an additional measurement sensor 19, and the circuit corrects the pressure of the two main pressure systems 12 by way of additional servo devices 20. But because this correction has reverse effects on joint fork 2 on shaft 1 to be assembled, this secondary correction is made by electronic circuit 16 also by way of secondary pressure systems 18. In this way, joint parts 2, 3, 4 remain in their rest position without center misalignment throughout the entire pressing and peening process. Pressure systems 8 are fed by a central pressure source 21.

What is claimed is:

1. A method for assembling universal joints comprising a shaft secured to a joint fork having fork arms adapted to receive a joint cross and mounting bearings, wherein a joint cross positioned in said fork arms is to be secured in said joint fork by pressing mounting bearings into said fork arms and onto said joint cross, comprising the steps of:

providing a main pressure system to each of said fork arms adapted to press said bearings into said fork arms;

simultaneously pressing said bearings into said fork arms;

sensing the alignment of said joint fork and generating an alignment signal reflective of said joint fork alignment;

determining the corrective force necessary to return said joint fork to a predetermined alignment in response to said alignment signal and generating a corrective force signal reflective of said corrective force; and changing the pressure in at least one of said main pressure systems in response to said corrective force signal such that a difference in pressure equal to said corrective force exists between said main pressure systems, whereby said joint fork is returned to said predetermined alignment.

2. The assembly method of claim 1, further comprising the steps of providing a secondary pressure system to each of said fork arms adapted to provide a pressing force to said bearings in addition to that provided by said main pressure systems and wherein the change in pressure in response to said corrective force signal is made to said secondary pressure systems.

3. The assembly method of claim 2, wherein changes in pressure are made to said main pressure systems as well as said secondary pressure systems.

4. The assembly method according to claim 3, further comprising the step of generating a partial pressure in said secondary pressure systems, which partial pressure serves to keep said fork arms at a constant pretension and which partial pressure is proportional to the prevailing pressure of said main pressure systems.

5. An apparatus for assembling universal joints comprising a shaft secured to a joint fork having fork arms adapted to receive a joint cross and mounting bearings, wherein a joint cross positioned in said fork arms is to be secured in said joint fork by pressing mounting bearings into said fork arms and onto said joint cross, comprising:

a frame;

positioning means, attached to said frame, for securing said joint fork and said joint cross to said frame so that said joint cross is positioned at a predetermined alignment in said fork arms;

at least two main pressure systems, each being attached to said frame and adapted to simultaneously press said bearings into said fork arms;

a pressure source;

an electronic sensor positioned to sense the alignment of said joint fork and generate an alignment signal reflective of said joint fork alignment;

a servo unit connected between said pressure source and each of said main pressure systems for regulating the pressure in said main pressure systems in response to a regulating signal, wherein each of said main pressure systems is provided with a separate servo unit; and an electronic circuit, connected to receive said alignment signal and, in response thereto, generate independent regulating signals to each of said servo units, wherein said regulating signals cause said servo units to generate a difference in pressure between said main pressure systems and wherein said difference in pressure is equal to the force necessary to return said joint fork to said predetermined alignment.

6. The apparatus of claim 5 further comprising a secondary pressure system positioned between said frame and said main pressure system and a servo unit connected between said pressure source and each of said secondary pressure systems for regulating the pressure in said secondary pressure systems in response to a second regulating signal, wherein the regulating signals generated by said electronic circuit to create a difference in pressure comprises said second regulating signals, whereby a difference in pressure equal to the force necessary to return said joint fork to said predetermined alignment is established between said secondary pressure systems.

* * * * *